(12) United States Patent
Zhou (10) Patent No.: US 12,206,862 B2
(45) Date of Patent: Jan. 21, 2025

(54) METHODS FOR NON-REFERENCE VIDEO-QUALITY PREDICTION

(71) Applicant: Avago Technologies International Sales Pte. Limited, Singapore (SG)

(72) Inventor: Minhua Zhou, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 17/382,154

(22) Filed: Jul. 21, 2021

(65) Prior Publication Data

US 2023/0024037 A1    Jan. 26, 2023

(51) Int. Cl.

| H04N 19/154 | (2014.01) |
| G06N 3/044 | (2023.01) |
| G06N 3/063 | (2023.01) |
| G06N 5/04 | (2023.01) |
| H04N 19/164 | (2014.01) |
| H04N 19/176 | (2014.01) |

(52) U.S. Cl.
CPC .......... *H04N 19/154* (2014.11); *G06N 3/044* (2023.01); *G06N 3/063* (2013.01); *G06N 5/04* (2013.01); *H04N 19/164* (2014.11); *H04N 19/176* (2014.11)

(58) Field of Classification Search
CPC .. H04N 19/154; H04N 19/164; H04N 19/176; G06N 3/0445; G06N 3/063; G06N 5/04
See application file for complete search history.

(56) References Cited

U.S. PATENT DOCUMENTS

| 11,250,546 | B2* | 2/2022 | Pu | G06N 3/04 |
| 11,288,770 | B2* | 3/2022 | Kim | H04N 19/132 |
| 2013/0293725 | A1* | 11/2013 | Zhang | H04N 17/02 |
| | | | | 348/180 |
| 2018/0084280 | A1* | 3/2018 | Thiagarajan | H04N 19/61 |
| 2019/0258902 | A1* | 8/2019 | Colligan | G06V 20/41 |
| 2021/0042882 | A1* | 2/2021 | Kim | G06N 3/045 |
| 2021/0385502 | A1* | 12/2021 | Dinh | H04N 19/46 |

OTHER PUBLICATIONS

Jiang et al., "No-Reference Perceptual Video Quality Measurement for High Definition Videos Based on an Artificial Neural Network," 2008 International Conference on Computer and Electrical Engineering, Dec. 2008, pp. 424-427.
Shahid et al., "A reduced complexity no-reference artificial neural network based video quality predictor," 4th International Congress on Image and Signal Processing, Oct. 2011, pp. 517-521.
Kang et al., "Convolutional Neural Networks for No-Reference Image Quality Assessment," 2014 IEEE Conference on Computer Vision and Pattern Recognition, Jun. 2014, pp. 1733-1740.
Extended European Search Report from European Patent Application No. 22185436.7, dated Dec. 14, 2022, 10 pages.

* cited by examiner

*Primary Examiner* — Richard T Torrente (57) ABSTRACT

A system for non-reference video-quality prediction includes a video-processing block to receive an input bitstream and to generate a first vector, and a neural network to provide a predicted-quality vector after being trained using training data. The training data includes the first vector and a second vector, and elements of the first vector include high-level features extracted from a high-level syntax processing of the input bitstream.

16 Claims, 7 Drawing Sheets

METHODS FOR NON-REFERENCE VIDEO-QUALITY PREDICTION

TECHNICAL FIELD

The present description relates generally to video processing and, in particular, to methods for non-reference video-quality prediction.

BACKGROUND

Non-reference video-quality prediction has increasingly gained importance for remote monitoring of client-side video quality. Utilizing non-reference video-quality prediction, one can estimate video quality without viewing the received video or requiring the original video content. By enabling automatic diagnosis of video-quality issues reported by end users, the non-reference video-quality prediction can help reduce customer support costs. A common practice is to perform video-quality analysis in the pixel domain on the decoded video sequence. More accurate methods may use not only the pixel domain information, but also the bitstream characteristics measured at different decode stages.

In the past decades, a number of video compression standards have been developed, such as the International Organization for Standardization (ISO)/International Electrotechnical Commission (IEC) Moving Picture Experts Group (MPEG) and international Telecommunication Union-(ITU-) T joint international standards MPEG-2-H.262, advanced video coding (AVC)/H.264, high-efficiency video coding (HEVC)/H.265 and versatile video coding (VVC)/H.266, and industry standards VP8, VP9 and Alliance for Open Media Video 1 (AV1). An end user may receive video content compressed in a variety of video formats. Although these standards provide different levels of compression efficiency and differ from each other in detail, they all use a common block-based hybrid coding structure. The common coding structure makes it possible to develop a generic method for non-reference video-quality prediction on the client side. For example, VVC, the latest video compression standard from MPEG/ITU-T, still employs a block-based hybrid-coding structure. In VVC, a picture is divided into coding-tree units (CTUs), which can be up to 128×128 pixels in size. A CTU is further decomposed into coding units (CUs) of different sizes by using a so-called quad-tree plus binary-and-triple-tree (QTBTT) recursive block-partitioning structure. A CU can have a four-way split by using quad-tree partitioning, a two-way split by adapting horizontal or vertical binary-tree partitioning, or a three-way split by using horizontal or vertical ternary-tree partitioning. A CU can be as large as a CTU and as small as a 4×4 pixel block size.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for non-reference video-quality prediction. The disclosed technology implements non-reference video-quality prediction by using a neural network, which is trained to predict root-mean-squared-error (RMSE) values between a reconstructed picture after an in-loop filter and the original picture, as explained in more detail below. The RMSE values can be converted into video-quality scores, such as peak-signal noise ratio (PSNR) values.

Figure 1:
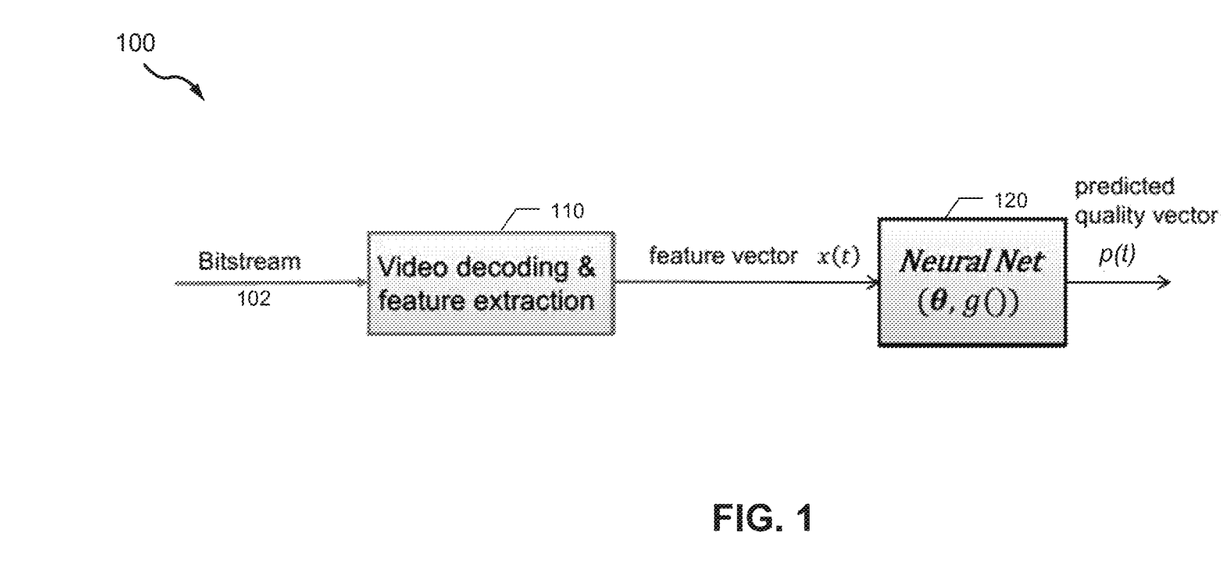
FIG. 1 is a high-level diagram illustrating an example of a neural-network-based non-reference video-quality prediction system, according to various aspects of the subject technology.

FIG. 1 is a high-level diagram illustrating an example of a neural network-based non-reference video-quality prediction system 100, according to various aspects of the subject technology. The neural network-based non-reference video-quality prediction system 100 (hereinafter, system 100) includes a video processing block 110 and a neural network 120. The video processing block 110 is a decoding and feature extraction block, some aspects (video decoding aspects) of which are discussed below with respect to FIG. 2. Video processing block 110 provides a feature vector x(t) from an input bitstream corresponding to a picture. The elements of the feature vector x(t) are divided into two categories, namely the high-level features extracted from the high-level syntax processing and the block-level features, obtained from the block-level decode processing.

The high-level features may include a transcode indicator, a codec type, a picture coding type, a picture resolution, a frame rate, a bit depth, a chroma format, a compressed picture size, a high-level quantization parameter (qp), an average temporal distance and a temporal layer ID. The transcode indicator determines whether the current picture is transcoded. Transcoding means that a video may be first compressed and decompressed in one format (e.g., AVC/H.264) and then recompressed into the same or a different format (e.g., HEVC/H.265). This information usually is not available in the bitstream but may be conveyed by a server to a client via external means. The codec type may include VVC/H.266, HEVC/H.265, AVC/H.264, VP8, VP9, AV1, etc. Each codec type may be assigned to a codec ID. The picture-coding type may include I-, B- and P-pictures, and each picture type may be assigned to an ID. The picture resolution can be, for example, 4K UHD, 1080p HD, 720p HD, and so on. Based on the lama samples in a picture, an ID may be assigned. Examples of the frame rate may include 60, 50, 30, 20 frame/sec. The frame rate is normalized with, e.g., 120 frame/sec. The bit-depth can be, for example, 8-bit or 10-bit and is normalized with 10-bit. The chroma format can be, for instance, 4:2:0, and each chroma format may be assigned to an ID, e.g., 0 for a 4:2:0 chroma format. The compressed picture size is normalized by the luma picture size to produce a bits-per-pixel (bbp) value. The high-level quantization parameter (qp) is an average qp for a picture obtained by parsing quantization parameters in the slice headers of the picture. The list0 average temporal distance represents an average temporal distance between the current picture and its forward (i.e., list0) reference pictures, obtained by parsing the slice-level reference-picture lists (RPLs) of the current picture. If the list0 reference pictures do not exist, it is set to 0. The list1 average temporal distance represents an average temporal distance between the current picture and its backward (i.e., list1) reference pictures, obtained by parsing the slice-level of the current picture. If the list1 reference pictures do not exist, it is set to 0. The temporal layer ID corresponds to the current picture. The temporal ID of a picture is assigned based on the hierarchical coding structure as discussed below.

The neural network 120 provides a predicted quality vector p(t), which is a neural network-based inference that enables prediction of the video quality of the picture. The predicted video quality can be measured in any appropriate video metric, such as PSNR, structural similarity index measure (SSIM), multiscale structural similarity index measure (MS-SSIM), video multimethod-assessment fusion (VMAF) and mean Opinion score (MOS), depending on the video quality selected for the neural network training. The predicted video quality of consecutive pictures can also be combined to produce video-quality prediction for a video segment.

Figure 2:
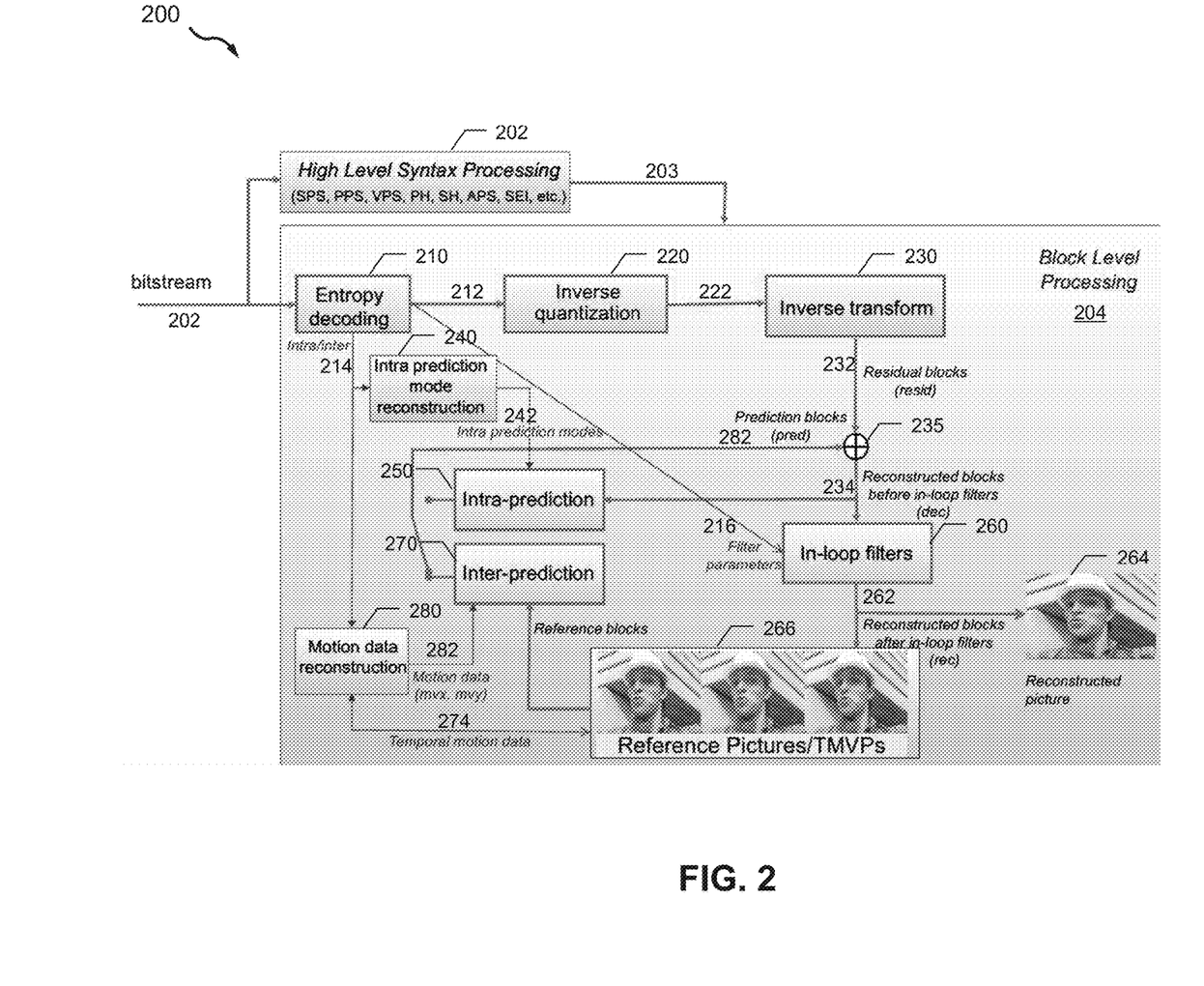
FIG. 2 is a diagram illustrating an example of a versatile video-coding (VVC) decoder, according to various aspects of the subject technology.

FIG. 2 is a diagram illustrating an example of a versatile video-coding (VVC) decoder 200 (an example of a video decoding block), according to various aspects of the subject technology. The VVC decoder 200 (hereinafter, decoder 200) includes a high-level syntax processing 202 and a block-level processing 204, which includes an entropy decoding engine 210, an inverse quantization block 220, an inverse transform block 230, an intra-prediction mode reconstruction block 240, an intra-prediction block 250, an in-loop filters block 260, an inter-prediction block 270 and a motion data reconstruction block 280.

The high-level syntax processing block 202 includes suitable logic and buffer circuits to receive input bitstream 202 and to parse the high-level syntax elements to produce the high-level features 203, including the transcode indicator, the codec type, the picture coding type, the picture resolution, the frame rate, the bit depth, the chroma format, the compressed picture size, the high-level qp, the average temporal distance and the temporal layer ID, as discussed above with respect to FIG. 1. The input bitstream 202 consists of an output of a last encoder of an encoding-decoding chain (not shown for simplicity). The high-level syntax elements may include sequence parameter sets (SPS), picture parameter sets (PPS), video parameter sets (VPS), picture headers (PH), slice headers (SET), adaptation parameter sets (APS), supplemental enhancement information (SEI) messages, and so on. The decoded high-level information is then used for configuring the decoder 200 to perform block-level decode processing.

At block level, the entropy decoding engine 210 decodes the incoming bitstream 202 and delivers the decoded symbols, including quantized transform coefficients 212 and control information 214. The control information includes delta intra-prediction modes (relative to the most probable modes), inter-prediction modes, motion vector differences (MVDs, relative to the motion vector predictors), merge indices (merge_idx), quantization scales and in-loop filter parameters 216. The intra-prediction reconstruction block 240 reconstructs intra-prediction mode 242 for a coding unit (CU) by deriving a most probable mode (MPM) list and using the decoded delta intra-prediction mode. The motion data reconstruction block 280 reconstructs the motion data 282 (e.g., motion vectors, reference index (indices)) by deriving an advanced motion vector predictor (AMVP) list or a merge/skip list and using MVDs. The decoded motion data 282 of the current picture may serve as the temporal motion vector predictors (TMVPs) 274 of decoding of future pictures and are stored in a decoded picture buffer (DPB).

The quantized transform coefficients 212 are delivered to the inverse quantization block 220 and then to the inverse transform block 230 to reconstruct the residual blocks 232 for a CU. Based on signaled intra- or inter-prediction modes, the decoder 200 may perform intra-prediction or inter-prediction (i.e., motion compensation) to produce the prediction blocks 282 for the CU. The residual blocks 232 and the prediction blocks 282 are then added together to generate the reconstructed CU before filters 234. The in-loop filters 260 perform in-loop filtering, such as deblocking filtering, sample adaptive-offset (SAO) filtering and adaptive-loop filtering (ALF) on the reconstructed blocks to generate the reconstructed CU after in-loop filters 262. The reconstructed picture 264 is stored in the DPB to serve as a reference picture for motion compensation of future pictures and is also sent to a display.

The block-based nature of video decoding processing makes it possible to extract features on the decoder side without incurring additional processing latency or increasing memory bandwidth consumption. The exacted features at block level help improve video-quality prediction accuracy when compared to the pixel-domain-only prediction methods.

Referring to the block-level processing 204, the block-level features may include the following: 1) Percentage of intra-coded blocks in the current picture, delivered by the entropy decoding engine 210; 2) Percentage of inter-coded blocks in the current picture, delivered by the entropy decoding engine 210; 3) Average block-level qp of the current picture, delivered by the entropy decoding engine 210; 4) Maximum block-level qp of the current picture, delivered by the entropy decoding engine 210; and 5) Minimum block-level qp of the current picture, delivered by the entropy decoding engine 210. The block-level features may also include a standard deviation of horizontal-motion vector of the current picture, computed in the motion data reconstruction block 280. For example, let mvx0(i),i=0, 1, . . . , $mv_{cnt0}$−1 and mvx1(i),i=0, 1, . . . , $mv_{cnt1}$−1 be the list0 and list1 horizontal-motion vectors reconstructed for the current picture, $mv_{cnt0}$, and let $mv_{cnt1}$ be the number of list0 and list1 block vectors of the picture, respectively, and let the vectors be normalized at block level by using the temporal distance between the current prediction unit (PU)

and its reference block(s). In this case, the standard deviation of horizontal motion vector of the current picture, $sd_{mvx}$, is computed by:

$$\begin{cases} \text{mean} = \\ \left(\sum_{k=0}^{mv_{cnt0}-1} |mvx0(i)| + \sum_{k=0}^{mv_{cnt1}-1} |mvx1(i)|\right)/(mv_{cnt0} + mv_{cnt1}) \\ sd_{mvx} = \sqrt{\dfrac{\sum_{k=0}^{mv_{cnt0}-1} mvx0(i)^2 + \sum_{k=0}^{mv_{cnt1}-1} mvx1(i)^2}{mv_{cnt0} + mv_{cnt1}} - \text{mean}^2} \end{cases} \quad \text{Eq. (1)}$$

Another feature that the block-level features may include is an average motion-vector size of the current picture, computed in the motion data block 280. For example, let (mvx0(i), mvy0(i)), i=0, 1, . . . , $mv_{cnt0}$–1 and (mvx1(i), mvy1(i), i=0, 1, . . . , $mv_{cnt1}$–1 be the list0 and list1 motion vectors reconstructed for the current picture, $mv_{cnt0}$, and $mv_{cnt1}$ be the number of list0 and list1 block vectors of the picture, respectively, and let the vectors be normalized at block level by using the temporal distance between the current PU and its reference block(s). In this case, the average motion vector size, $avg_{mv}$, is computed by:

$$avg_{mv} = \dfrac{\sum_{k=0}^{mv_{cnt0}-1} \sqrt{mvx0(i)^2 + mvy0(i)^2} + \sum_{k=0}^{mv_{cnt1}-1} \sqrt{mvx1(i)^2 + mvy1(i)^2}}{(mv_{cnt0} + mv_{cnt1})} \quad \text{Eq. (2)}$$

The block-level features may also include an average absolute amplitude of the low-frequency inverse quantized transform coefficients of the current picture, computed in the inverse quantization block 220. For example, if a transform unit (TU) size is W*H, a coefficient is defined as a low-frequency coefficient if its index in the TU in scanning order (i.e., the coefficient coding order in the bitstream) is less than W*H/2. The absolute amplitude is averaged over Y, U and V components of the picture. Of course, individual amplitudes could be computed for Y, U, and V components, separately.

Another potential feature of the block-level features is an average absolute amplitude of the high-frequency inverse quantized-transform coefficients of the current picture, computed in the inverse quantization block 220. For example, if a TU size is W*H, a coefficient is defined as a high-frequency coefficient if its index in the TU in scanning order (or the coefficient coding order in the bitstream) is larger than or equal to W*H/2. The absolute amplitude is averaged over Y, U and V components of the picture. Of course, individual amplitudes could be computed for Y, U, and V components, separately.

The block-level features may further include a standard derivation of prediction residual of the current picture, which is computed separately for Y, U, and V components by the inverse transform block 230. Let resid(i,j), for i=0, 1, . . . , picHeight–1,j=0, 1, . . . , picWidth–1 be a prediction residual picture of Y, or V component, the standard derivation of the predication residual for the component, $sd_{resid}$ is computed by:

$$\begin{cases} \text{mean} = \sum_{k=0}^{picHeigh-1} \sum_{j=0}^{picWidth-1} resid(i,j)/ \\ (picHeight * picWidth) \\ sd_{resid} = \\ \sqrt{\sum_{k=0}^{picHeigh-1} \sum_{j=0}^{picWidth-1} \dfrac{resid(i,j)^2}{picHeight * picWidth} - \text{mean}^2} \end{cases} \quad \text{Eq. (3)}$$

Another feature that the block-level features may include is a root-mean-squared-error (RMSE) value between the reconstructed pictures before and after in-loop filters, computed separately for Y, U, and V components by the in-loop filter block 260, For example, if a codec (e.g., MPEG-2) has no in-loop filters or the in-loop filters are turned off, the RMSEs are set to 0 for the picture. Let dec(i,j) and rec(i,j), for i=0, 1, . . . , picHeight–1, j=0, 1, . . . , picWidth–1 be a reconstructed Y, U, or V component picture before and after in-loop filters, respectively. The RMSE for the component, rmse, is then computed by:

$$rmse = \sqrt{\sum_{k=0}^{picHeigh-1} \sum_{j=0}^{picWidth-1} \dfrac{(rec(i,j) - dec(i,j))^2}{picHeight * picWidth}} \quad \text{Eq. (4)}$$

The block-level features may further include a standard derivation of the reconstructed picture after in-loop filters, computed separately for Y, U, and V components by the in-loop filter block. For example, let rec(i,j), for i=0, 1, . . . , picHeight–1,j=0, 1, . . . , picWidth–1 be a reconstructed Y, U or V component picture after in-loop filters. The standard derivation of the reconstructed component picture, $sd_{rec}$, is then computed by:

$$\begin{cases} \text{mean} = \sum_{k=0}^{picHeigh-1} \sum_{j=0}^{picWidth-1} rec(i,j)/ \\ (picHeight * picWidth) \\ sd_{resid} = \\ \sqrt{\sum_{k=0}^{picHeigh-1} \sum_{j=0}^{picWidth-1} \dfrac{rec(i,j)^2}{picHeight * picWidth} - \text{mean}^2} \end{cases} \quad \text{Eq. (5)}$$

Another feature that may be included in the block-level features is an edge sharpness of the reconstructed picture after in-loop filters, which can be computed separately for Y, U, and V components by the in-loop filter block. For example, let rec(i,j), $G_x(i,j)$ and $G_y(i,j)$ for i=0, 1, . . . , picHeight–1,j=0, 1, . . . , picWidth–1 be a Y, U or V component picture after in-loop filters and its corresponding horizontal/vertical edge sharpness maps, respectively. The edge sharpness of the reconstructed component picture, $edge_{sharpness}$, is then computed by:

$$edge_{sharpness} = \sqrt{\sum_{k=0}^{picHeigh-1} \sum_{j=0}^{picWidth-1} \dfrac{(G_x(i,j)^2 + G_y(i,j)^2)}{picHeight * picWidth}} \quad \text{Eq. (6)}$$

Where edge sharpness map $G_x(i,j)$ and $G_y(i,j)$ for i=0, 1, . . . , picHeight–1,j=0, 1, . . . , picWidth–1 may be computed by (e.g., using sobel filter):

$$\begin{cases} G_x(i,j) = rec(i-1, j-1) - rec(i-1, j+1) + 2(rec(i, j-1) - \\ \quad rec(i, j+1)) + rec(i+1, j-1) - rec(i+1, j+1) \\ G_y(i,j) = rec(i-1, j-1) - rec(i+1, j-1) + 2(rec(i-1, j) - \\ \quad rec(i+1, j)) + rec(i-1, j+1) - rec(i+1, j+1) \end{cases} \quad \text{Eq. (7)}$$

Note that in the equation above, reconstructed picture samples used for computing $G_x(i,j)$ and $G_y(i,j)$ along the picture boundaries can go beyond the picture boundaries, and the unavailable samples can be padded with the closest picture boundary samples. Another solution is simply to avoid computing $G_x(i,j)$ and $G_y(i,j)$ along the picture boundaries and set them to 0, i.e., $$\begin{cases} G_x(i, j) = 0, \text{ if } i = 0 \text{ or } j = 0 \\ G_y(i, j) = 0, \text{ if } i = 0 \text{ or } j = 0 \end{cases} \quad \text{Eq. (8)}$$

Figure 3:
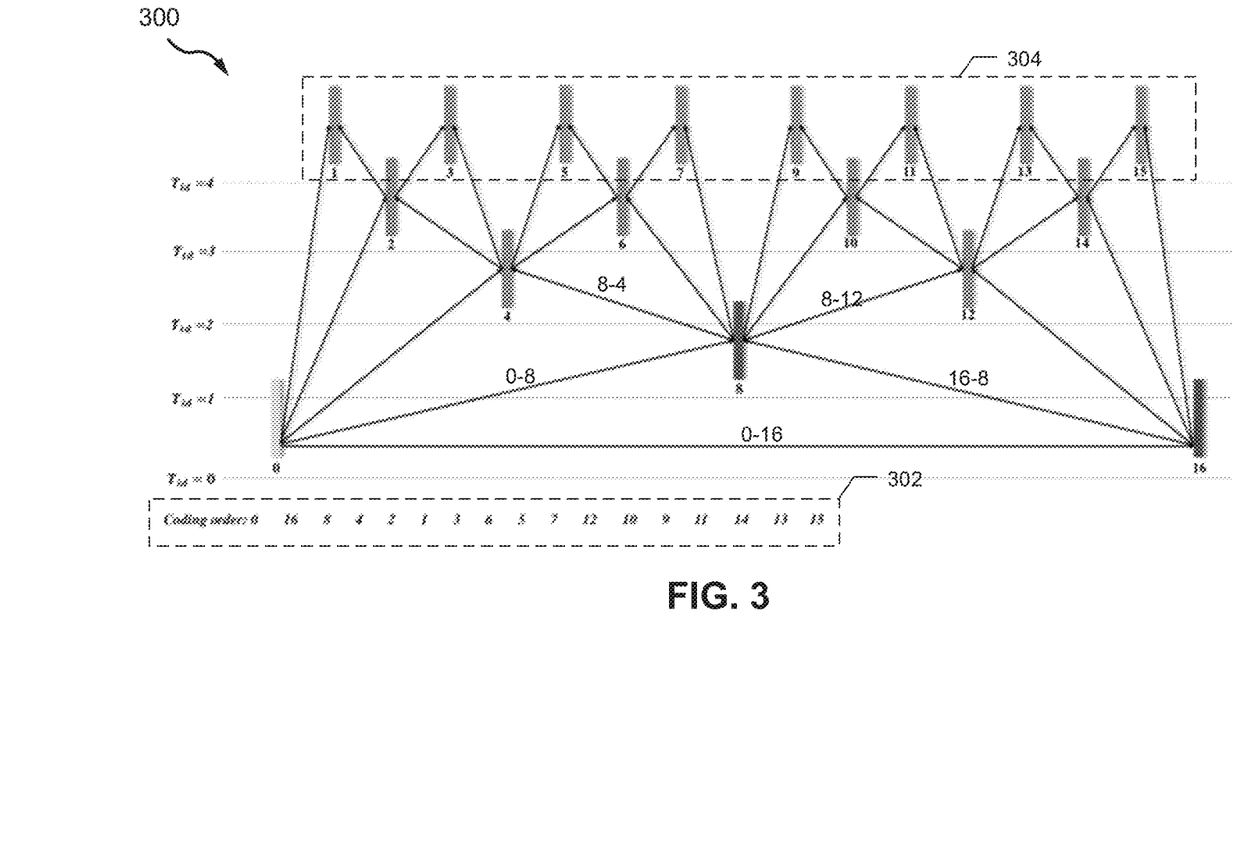
FIG. 3 is a diagram illustrating an example of a hierarchical coding structure, according to various aspects of the subject technology.

FIG. 3 is a diagram illustrating an example of a hierarchical coding structure 300, according to various aspects of the subject technology. The vertical column shows temporal IDs (Tid) of pictures, which is related to temporal scalable coding and, in some aspects, is assigned based on the hierarchical coding structure 300 as shown in FIG. 3. The box 302 shows the original coding order of the pictures as received in the bitstream. The blocks (1, 2, 3 ... 16) shown in this diagram represents pictures ire display order and the arrows indicate the prediction dependencies of the pictures. For example, arrows 0-8 and 16-8 indicate that picture 8 depends on pictures 0 and 16, and arrows 8-4 and 8-12 show dependencies of pictures 4 and 12 on picture 8. The rid values divide the pictures into several (e.g., 4) subsets. The pictures of the higher Tid value subset are less significant in decoding. For example, a less capable decoder may filter out the pictures with Tid=4 (pictures having numbers 1, 3, 5, 7, 9, 11, 13 and 15) as they belong to the least significant subset.

Figure 4:
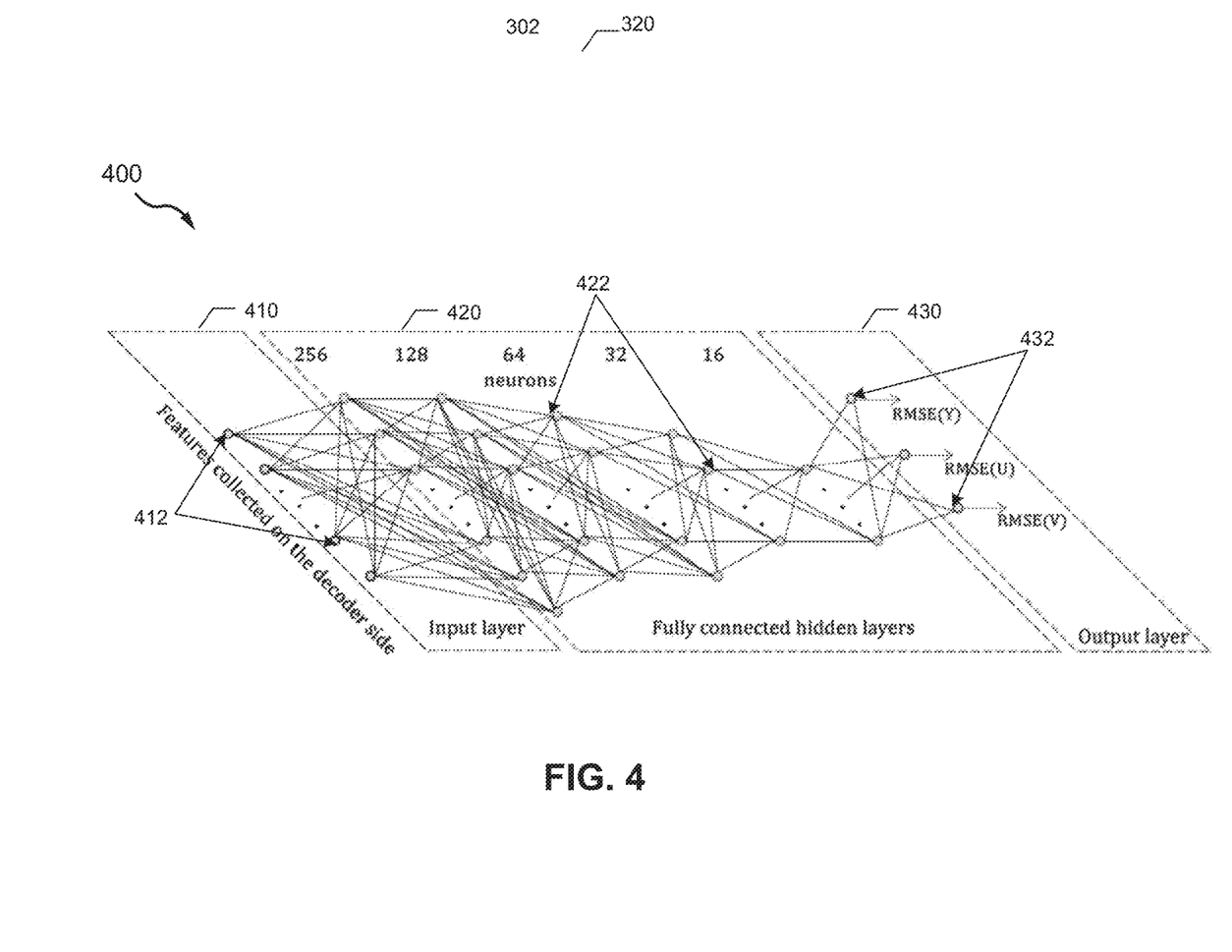
FIG. 4 is a schematic diagram illustrating an example of a neural network used for video-quality prediction, according to various aspects of the subject technology.

FIG. 4 is a schematic diagram illustrating an example architecture of a neural network 400 used for video-quality prediction, according to various aspects of the subject technology. The neural network 400 may be used for non-reference video-quality prediction. The neural network 400 includes an input layer 410, hidden layers 420 and an output layer 430. In some aspects, the input layer 410 includes several input nodes 412. The hidden layers 420 are made up of, for example, five fully connected hidden layers of 256, 128, 64, 32 and 16 neurons of 422, respectively The input layer 410 takes a feature vector extracted from decoding of the current picture as input. Because the quality metric used in this example is PSNR, the output layer produces RMSEs for Y, U and V components. In one or more aspects, the total number of network parameters is about 51,747. The activation function used is rectified linear unit (ReLU). To convert the predicted RMSEs to PSNR values, the following equation can be used:

$$\begin{cases} PSNR_y = 20\log_{10} \dfrac{2^{bitDepth} - 1}{RMSE(Y)} \\ PSNR_u = 20\log_{10} \dfrac{2^{bitDepth} - 1}{RMSE(U)} \\ PSNR_v = 20\log_{10} \dfrac{2^{bitDepth} - 1}{RMSE(V)} \end{cases} \quad \text{Eq. (9)}$$

Figure 5:
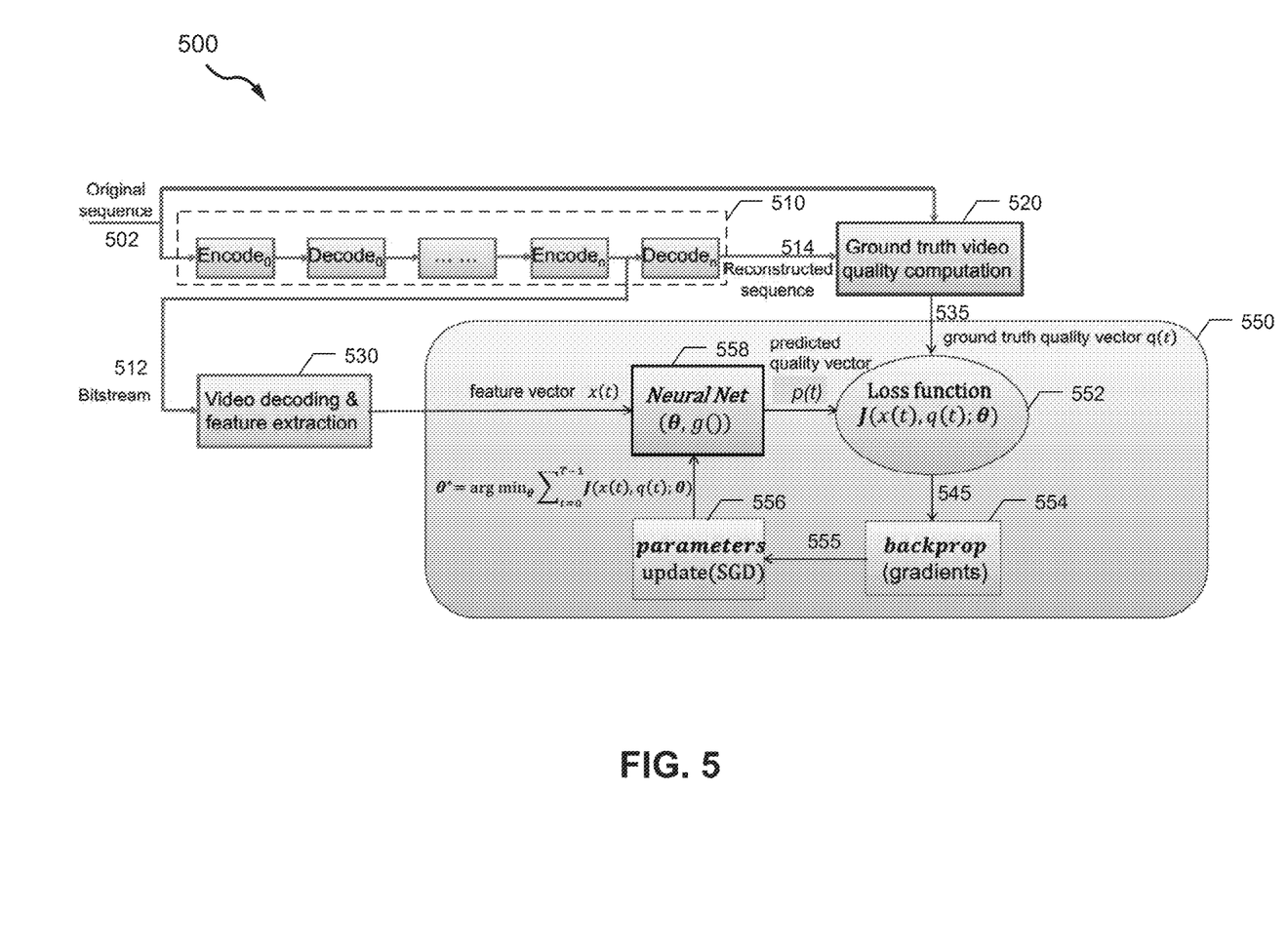
FIG. 5 is a diagram illustrating an example of a process for training-data generation and network training, according to various aspects of the subject technology.

FIG. 5 is a diagram illustrating an example of a process 500 for training-data generation and network training, according to various aspects of the subject technology. The neural network is represented by the network parameters θ and an activation function g( ). A training or test data vector is associated with a decoded picture, which consists of a feature vector x(t) and a ground-truth video-quality vector q(t). The framework 500 is used to generate the training data. The process 500 starts with process step 510, in which encoding and decoding of an original sequence 502 is performed using the selected compression standard (format), coding structure (e.g., all intra, random-access and low-delay configurations), bitrate, and so on. While normally a sequence is encoded and decoded once, in some use cases (e.g., transcoding and transrating) the sequence may be encoded and decoded multiple times using a cascade of encode and decode stages with different compression formats and bitrates. For example, a sequence may be first encoded and decoded with AVC/H.264 and then transcoded into HEVC/H.265 format. In all the cases, including transcoding and/or transrating, at a process step 520, the reconstructed sequence 514 is used to compute the ground-truth video-quality vectors q(t) for coded pictures between the original sequence 502 and the reconstructed sequence 514. Any suitable quality metric (e.g., PSNR, SSIM, MS-SSIM, video multimethod fusion (VMF) and mean opinion score (MOS)) can be employed to represent the ground-truth and predicted video-quality vectors. Finally, the resulting bitstream 512 (i.e., the output of the last encoder in the encoding/decoding chain) is fed into the decoder for the high-level and block-level feature extraction, at process step 530, to create feature vectors x(t) for the sequence. Given a labeled training set {(x(0), q(0)), (x(1), q(1)), ..., (x(T−1))}, the neural network parameters θ can be trained, at the process step 550, by processing (minimizing) loss function J (plus some regularization term with respect to parameters θ, $$\theta^* = \arg\min_\theta \Sigma_{t=0}^{T-1} J(x(t), q(t); \theta) \quad \text{Eq. (10)}$$

The supervised training steps include computing the predicted-quality vector p(t) using feature vector x(t) at inference step 558, computing prediction loss, at process step 552, between the predicted-quality vector p(t) and ground truth quality vector q(t). At process step 554, partial derivatives (gradients) for each network layer are computed using back propagation. At process step 556, parameters θ are updated using stochastic gradient descent (SGD), and the updated parameters θ are fed to the neural network 400 of FIG. 4, The above steps are repeated until training criteria are met.

A feasibility study was performed for the neural network 400. In total, 444,960 training vectors and 49,440 test vectors were used in the study. The first set of vectors was generated using a commercial AVC/H.264 and HEVC/H.265 encoder with four typical bitrate points and the constant bit rate (CBR) control. The second set of vectors simulated the transcoding/transrating environment, in which the test sequences were first compressed with the AVC/H.264 encoder, then the reconstructed sequences were recompressed with the HEVC/H.265 encoder (i.e., transcoding) and the AVC/H.264 encoder (i.e., transrating). As mentioned above, here, the ground-truth RMSEs in the transcoding/transrating case were computed against the original sequences, not against the reconstructed sequences after the first-pass AVC/H.264 encoding.

After a training of 2,000 epochs with mean absolute error as loss function, the average PSNR (Y, U, V) prediction error (in dB) and the failure rate was (0.20, 0.16, 0.17)/0.96% for the training set and (0.59, 0.41, 0.39)/11.68% for the test set, respectively. Note that the prediction failure rate here is the percentage of training/test vectors for which the average YUV PSNR prediction error (i.e., the mean absolute PSNR difference between the predicted and the ground-truth Y, U, V PSNRs) is larger than one dB.

In some implementations, instead of using input feature vectors x(t) of full size, a subset of features may be used. For example, a less complex network (e.g., with a reduced count of hidden layers and/or neurons) may use input feature vectors that contain the high-level features only for video-quality prediction. The high-level features normally can be exacted by using firmware without the need for block-level decoder hardware/software changes. Decoders without the capability of block-level feature exaction may deploy a non-complex or less-complex neural network for video-quality prediction, while other decoders with full capability of feature exaction may deploy a more complex network. The neural networks may have different net parameters and may or may not have the same network architecture. To share the same architecture with the more complex neural network, the less accurate network may still use input feature vectors of full size but set the block-level features to zero in the input vectors. In one or more implementations, the decoded pictures may be classified into different content categories (e.g., nature video, screen content, and so on) by analyzing bitstream characteristics and/or decoded pictures, or the classification information may be conveyed by the server, and the network used for video prediction may be switched at picture level based on the content classification information. In some aspects, the classification information may be added to the input feature vector as an additional feature, avoiding the need for the network switch at picture level.

In some implementations, users may be able to report the discrepancy between the predicted video quality and observed video quality. The deployed network may be refined by leveraging the user feedback to improve prediction accuracy. To reduce the overhead of updating the video-quality prediction network, in some aspects only a subset of network layers or parameters may be refined and updated.

Figure 6:
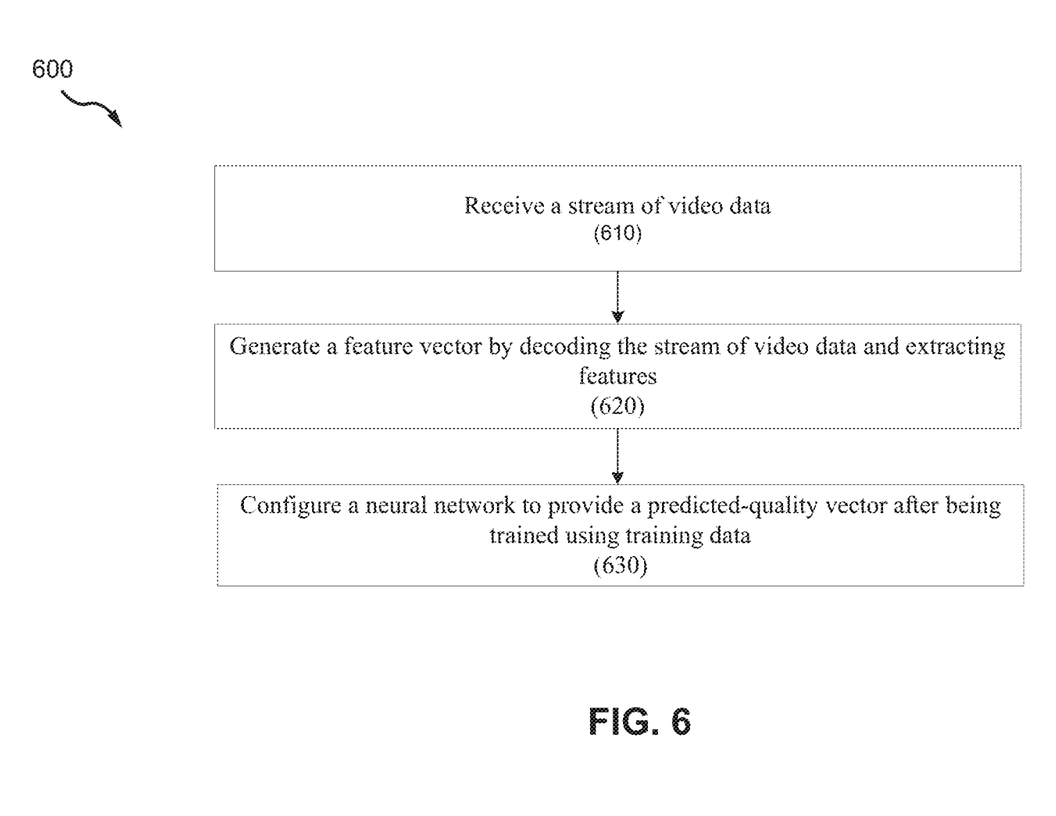
FIG. 6 is a flow diagram illustrating a method of non-reference video-quality prediction, according to various aspects of the subject technology.

FIG. 6 is a flow diagram illustrating a method 600 of non-reference video-quality prediction, according to various aspects of the subject technology. The method 600 includes receiving a stream of video data (610) and generating a feature vector by decoding the stream of video data and extracting features (620). The method 600 further includes configuring a neural network to provide a predicted-quality vector after being trained using training data (630). The training data includes the feature vector and a ground-truth video-quality vector, and generating the feature vector consists of high-level syntax processing of the stream of video data to extract the high-level feature elements and block-level processing to exact the block-level feature elements.

Figure 7:
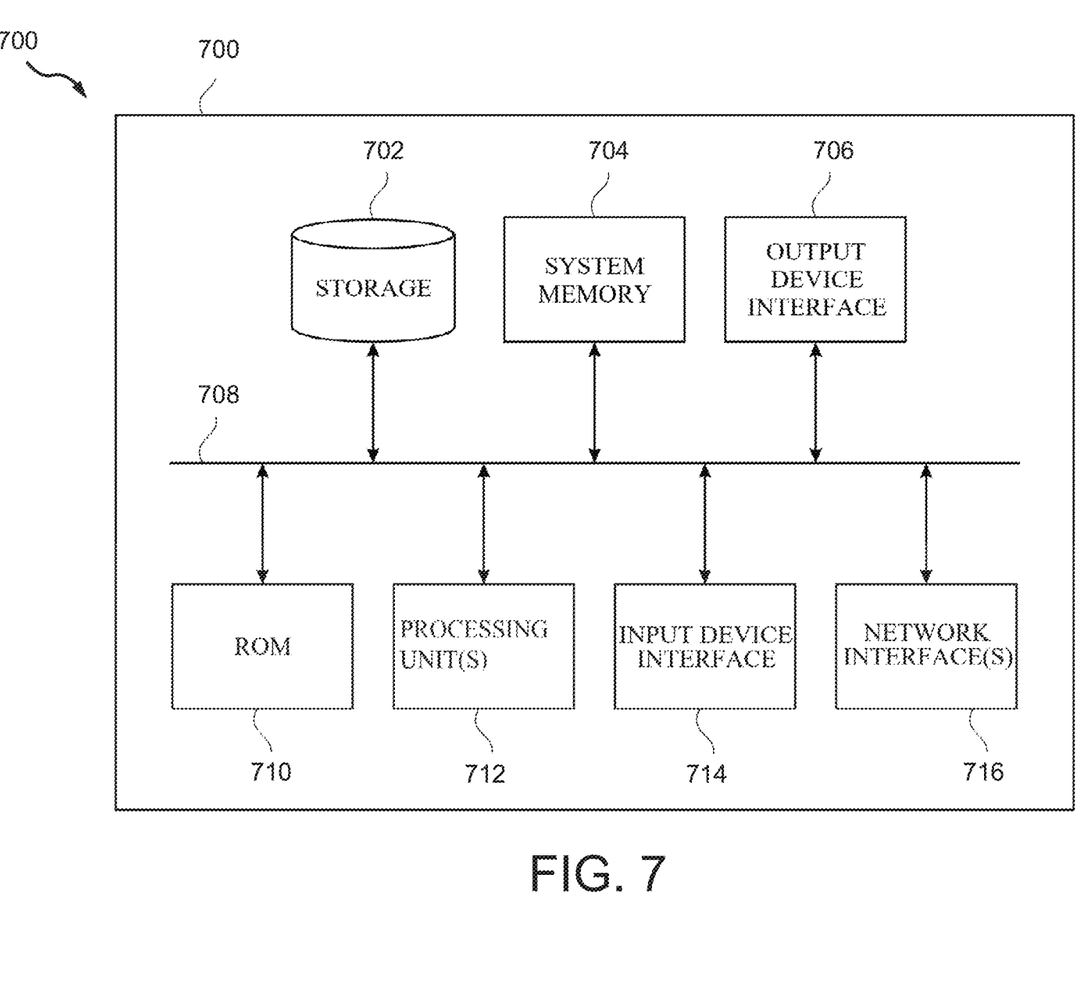
FIG. 7 is a block diagram illustrating an electronic system within which one or more aspects of the subject technology can be implemented.

FIG. 7 is a block diagram illustrating an electronic system within which one or more aspects of the subject technology can be implemented. The electronic system 700 can be a communication device such as a smartphone, a smartwatch or a tablet, a desktop computer, a laptop, a wireless router, a wireless access point (AP), a server or other electronic devices. The electronic system 700 may include various types of computer-readable media and interfaces for various other types of computer-readable media. The electronic system 700 includes a bus 708, one or more processor(s) 712, a system memory 704 (and/or buffer), a read-only memory (ROM) 710, a permanent storage device 702, an input-device interface 714, an output-device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a flash drive and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory such as random access-memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieves instructions to execute and data to process in order to execute the processes of one or more implementations.

The bus 708 also connects to the input- and output-device interfaces 714 and 706. The input-device interface 714 enables a user to communicate information and select commands to the electronic system 700. Input devices that may be used with the input-device interface 714 may include, for example, alphanumeric keyboards and pointing devices (also called "cursor control devices"). The output-device interface 706 may enable, for example, the display of images generated by electronic system 700. Output devices that may be used with the output-device interface 706 may include, for example, printers and display devices such as a liquid crystal display (LCD), a light-emitting diode (LED) display, an organic light emitting diode (OLED) display, a flexible display, a flat-panel display, a solid-state display, a projector, or any other device for outputting information. One or more implementations may include devices that function as both input and output devices, such as touchscreens. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7 the bus 708 also couples the electronic system 700 to one or more networks and/or to one or more network nodes through the one or more network interface(s) 716. In this manner, the electronic system 700 can be a part of a network of computers such as a local area network (LAN), a wide area network (WAN), or an Intranet or a network of networks such as the Internet. Any or all components of the electronic system 700 can be used in conjunction with the subject disclosure, although the disclosed technology can also be implemented using distributed systems, for example, distributed processing and storage systems.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory such as RAM, DRAM, SRAM, T-RAM, Z-RAM, or TTRAM. The computer-readable medium also can include any non-volatile semiconductor memory such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, or Millipede memory.

Further, the computer-readable storage medium can include any non-semiconductor memory such as optical disk storage, magnetic disk storage, magnetic tape, other magnetic storage devices, or any other medium capable of storing one or more instructions such as a distributed storage system. In one or more implementations, the tangible computer-readable storage medium can be directly coupled to a computing device, while, in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions can also be realized as or can include data. Computer-executable instructions can also be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits such as ASICs or FPGAs. In one or more implementations, such integrated circuits execute instructions that are stored on the circuit itself.

Those of skill in the art would appreciate that the various illustrative blocks, modules, elements, components, memory systems, and algorithms described herein may be implemented as electronic hardware, computer software, or combinations of both. To illustrate this interchangeability of hardware and software, various illustrative blocks, modules, elements, components, memory systems, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that not all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products (e.g., cloud-based applications) or multiple devices of a distributed system As used in this specification and any claims of this application, the terms "base station," "receiver," "computer," "server," "processor," and "memory" all refer to electronic or other technological devices. These terms exclude people or groups of people. For the purposes of the specification, the term "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" and "at least one of A, B, or C" each refer to only A, only B, or only C; any combination of A, B, and C; and/or at least one of each of A, B, and C.

The predicate phrases "configured to," "operable to," and "programmed to" do not imply any particular tangible or intangible modification of a subject but rather are intended to be used interchangeably. In one or more implementations, a processor configured to monitor and control an operation or a component ay also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the terms "include," "have," or the like are used in the descriptions or the claims, such terms are intended to be inclusive in a manner similar to the term "comprise," as "comprise" is interpreted when employed as a transitional word in a claim.

All structural and functional equivalents to the elements of the various aspects described throughout this disclosure that are known or later conic to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a memory system claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender e.g., hers and its) and vice versa. Headings and subheadings, if any, are used for convenience only and do not limit the subject disclosure.

What is claimed is:

1. A system, comprising:
    a video decoder configured to receive and decode an input bitstream to reconstruct a picture from the input bitstream, and to generate a first vector comprising features extracted from the input bitstream by the video decoder and features determined by the video decoder during reconstruction of the picture; and
    a neural network configured to generate a second vector, based on the first vector, comprising one or more metrics representing a predicted quality of the picture reconstructed by the video decoder,
    wherein one or more parameters of the neural network are trained by:
        computing a first training vector based on a test bitstream that has been decoded,
        generating, using the video decoder, a second training vector comprising features extracted from the test bitstream and determined by the video decoder,
        generating, using the neural network, a third training vector based on the second training vector,
        computing a prediction loss between the first training vector and the third training vector, and
        updating the one or more parameters based on the prediction loss.

2. The system of claim 1, wherein the video decoder is configured to extract the features from the input bitstream by parsing syntax elements in the input bitstream.

3. The system of claim 2, wherein the syntax elements comprise at least one of sequence parameter sets, picture parameter sets, video parameter sets, picture headers, slice headers, adaptation parameter sets, or supplemental enhancement information messages.

4. The system of claim 2, wherein the features extracted from the input bitstream comprise at least one of a transcode indicator, a codec type, a picture coding type, a picture resolution, a frame rate, a bit depth, a chroma format, a compressed picture size, a high-level quantization parameter, an average temporal distance, or a temporal layer identifier.

5. The system of claim 1, wherein the features determined by the video decoder during reconstruction of the picture comprise at least one of a percentage of intra-coded blocks in the picture, a percentage of inter-coded blocks in the picture, an average block-level quantization parameter for the picture, a maximum block-level quantization parameter for the picture, a minimum block-level quantization for the picture, a standard deviation of horizontal-motion vectors for the picture, an average motion-vector size for the picture, an average absolute amplitude of low-frequency inverse quantized transform coefficients for the picture, an average absolute amplitude of high-frequency inverse quantized-transform coefficients for the picture, a standard deviation of a prediction residual for the picture, a root-mean-squared error value between reconstructed pictures before and after in-loop filters, a standard deviation of the reconstructed picture after in-loop filters, or an edge sharpness of the reconstructed picture after in-loop filters.

6. The system of claim 1, wherein the one or more metrics representing the predicted quality of the reconstructed picture comprise at least one of a peak signal noise ratio, a structural similarity index measure, a multiscale similarity index measure, a video multimethod assessment fusion, or a mean opinion score.

7. The system of claim 6, wherein an output layer of the neural network is configured to generate root-mean-squared-error values.

8. The system of claim 7, wherein the root-mean-squared-error values are converted into peak signal noise ratio values.

9. A method, comprising:
    receiving and decoding, by a video decoder, an input bitstream to reconstruct a picture from the input bitstream;
    generating, by the video decoder, a first vector comprising features extracted from the input bitstream by the video decoder and determined during reconstruction of the picture by the video decoder;
    generating, using a neural network, a second vector comprising one or more metrics representing a predicted quality of the reconstructed picture, wherein the second vector is based on the first vector,
    wherein one or more parameters of the neural network are trained by:
        computing a first training vector based on a test bitstream that has been decoded;
        generating, using the video decoder, a second training vector comprising features extracted from the test bitstream and determined by the video decoder;
        generating, using the neural network, a third training vector based on the second training vector;

computing a prediction loss between the first training vector and the third training vector; and updating the one or more parameters based on the prediction loss.

10. The method of claim 9, wherein the features are extracted from the input bitstream by parsing syntax elements in the input bitstream.

11. The method of claim 10, wherein the syntax elements comprise at least one of sequence parameter sets, picture parameter sets, video parameter sets, picture headers, slice headers, adaptation parameter sets, or supplemental enhancement information messages.

12. The method of claim 10, wherein the features extracted from the input bitstream comprise at least one of a transcode indicator, a codec type, a picture coding type, a picture resolution, a frame rate, a bit depth, a chroma format, a compressed picture size, a high-level quantization parameter, an average temporal distance, or a temporal layer identifier.

13. The method of claim 9, wherein the features determined by the video decoder during reconstruction of the picture comprise at least one of a percentage of intra-coded blocks in the picture, a percentage of inter-coded blocks in the picture, an average block-level quantization parameter for the picture, a maximum block-level quantization parameter for the picture, a minimum block-level quantization for the picture, a standard deviation of horizontal-motion vectors for the picture, an average motion-vector size for the picture, an average absolute amplitude of low-frequency inverse quantized transform coefficients for the picture, an average absolute amplitude of high-frequency inverse quantized-transform coefficients for the picture, a standard deviation of a prediction residual for the picture, a root-mean-squared error value between reconstructed pictures before and after in-loop filters, a standard deviation of the reconstructed picture after in-loop filters, or an edge sharpness of the reconstructed picture after in-loop filters.

14. The method of claim 9, wherein the one or more metrics representing the predicted quality of the reconstructed picture comprise at least one of a peak signal noise ratio, a structural similarity index measure, a multiscale similarity index measure, a video multimethod assessment fusion, or a mean opinion score.

15. The method of claim 14, wherein an output layer of the neural network is configured to generate root-mean-squared-error values.

16. The method of claim 15, wherein the root-mean-squared-error values are converted into peak signal noise ratio values.

* * * * *